(12) United States Patent
MacHarg

(10) Patent No.: US 7,988,428 B1
(45) Date of Patent: Aug. 2, 2011

(54) AXIAL PISTON MACHINE

(76) Inventor: John P. MacHarg, Ventura, CA (US)

( * ) Notice: Subject to any disclaimer, the term of this patent is extended or adjusted under 35 U.S.C. 154(b) by 1077 days.

(21) Appl. No.: 11/523,937

(22) Filed: Sep. 21, 2006

(51) Int. Cl.
*F04B 27/08* (2006.01)

(52) U.S. Cl. .............. 417/313; 417/271; 91/502; 92/71

(58) Field of Classification Search .............. 417/313, 417/269, 271, 401–404; 91/499, 501, 502; 92/68, 70, 71; 210/321.65, 321.66, 637, 210/652

See application file for complete search history.

(56) References Cited

U.S. PATENT DOCUMENTS

| | | | |
|---|---|---|---|
| 3,293,881 A | 12/1966 | Walker | |
| 3,431,747 A | 3/1969 | Hashemi | |
| 4,637,783 A * | 1/1987 | Andeen | 417/318 |
| 4,887,942 A | 12/1989 | Hauge | |
| 5,178,521 A * | 1/1993 | Ikeda et al. | 417/269 |
| 5,306,428 A | 4/1994 | Tonner | |
| 5,362,208 A * | 11/1994 | Inagaki et al. | 417/269 |
| 5,385,451 A * | 1/1995 | Fujii et al. | 417/269 |
| 5,397,218 A * | 3/1995 | Fujii et al. | 417/269 |
| 5,462,414 A | 10/1995 | Permar | |
| 5,778,757 A | 7/1998 | Kristensen et al. | |
| 6,000,316 A | 12/1999 | Moller et al. | |
| 6,017,200 A * | 1/2000 | Childs et al. | 417/404 |
| 6,659,731 B1 | 12/2003 | Hauge | |
| 6,773,226 B2 * | 8/2004 | Al-Hawaj | 415/116 |
| 6,804,962 B1 | 10/2004 | Prueitt | |
| 7,297,268 B2 * | 11/2007 | Herrington et al. | 210/321.66 |
| 2005/0166978 A1 | 8/2005 | Brueckman | |
| 2006/0120882 A1 * | 6/2006 | Jordan et al. | 417/269 |

* cited by examiner

*Primary Examiner* — Charles G Freay
*Assistant Examiner* — Patrick Hamo
(74) *Attorney, Agent, or Firm* — Connolly Bove Lodge & Hutz LLP

(57) ABSTRACT

A pressure pump in a primary liquid flow is combined with a pressure exchanger for energy recovery from a secondary liquid flow. A motor-driven rotor portion, including two (primary and secondary) rotatable drum-type cylinder assemblies, is disposed between end blocks configured with input/output ports and cavities forming sliding synchronous reversing valves. Interconnected piston assemblies, including at least one primary piston and one secondary piston, are reciprocated axially by a central angled swash-plate in a progressive sequential manner by rotation of the rotor portion. The combination machine can be optimized for beneficial deployment in a reverse osmosis seawater desalination system to provide unusual simplicity, high efficiency energy recovery from the brine discharge flow and low overall operating cost.

14 Claims, 6 Drawing Sheets

| NODE | P<br>PRESSURE | F<br>FLOW RATE | E<br>ENERGY |
|---|---|---|---|
| a | 2% | 100% | 2% |
| b | 100% | 100% | 100% |
| c | 2% | 40% | 0.8% |
| d | 99% | 60% | 59.4% |
| e | 1% | 60% | 0.6% |

US 7,988,428 B1

AXIAL PISTON MACHINE

FIELD OF THE INVENTION

The present invention relates to liquid pressure exchange mechanisms and more particularly it relates to structure and method of a self-contained combination of a primary pressure pump and a hydraulic pressure exchanger recovering energy, from pressure drop in a secondary liquid flow, and applying the recovered energy in a manner to assist the primary pressure pump in an efficient manner and thus reducing overall operating energy consumption and cost. This combination can be applied beneficially to RO (reverse osmosis) seawater desalination systems: energy available in the form of pressure and flow rate in the brine discharge path can be recovered to reduce overall operating energy cost to less than half, compared to an equivalent non-recovery system.

BACKGROUND OF THE INVENTION

The functional block diagram of FIG. 1 shows a basic form of an RO desalination system of known art without energy recovery. An RO (reverse osmosis) unit 10 is a hydraulic device, "hydraulic" being defined as "operated or effected by the action of water or other fluid of low viscosity".

In a primary liquid flow, pressure pump 12 receives seawater at its input node "a" at relatively low pressure from pre-conditioning and filtration apparatus. Pump 12, typically driven by an electric motor 14, develops high pressure at node "b", the input port of seawater chamber 10A of the RO unit, where the pressurized seawater is forced against an RO membrane 10B, typically polyamide thin-film composite that will not pass sodium or chloride ions.

About 40% of the input liquid traverses membrane 10B to compartment 100 as desalinated water, available to be drawn off as required at outlet "c". The remaining 60% of the input liquid including extracted residue leaves chamber 10A as a secondary flow of brine from RO brine exit port "d" where it passes through a back-pressure regulating valve 17 to discharge port "e" where the secondary brine flow is discharged to a drainage system as wastewater, typically returned to the sea.

It has long been recognized that there is a substantial amount of energy Ed available in the secondary liquid flow at RO brine exit port "d", where, compared to 100% pressure Pb and flow rate Rb of the primary flow at input port "b", the pressure Pd is typically 99% and the flow rate Rd is 60%.

The energy at the RO brine exit port "d" can be calculated from the product of pressure and flow rate (Ed=Pd*Rd): for the foregoing conditions, Ed is found to be 59.4% of Eb. Since the discharge at node "e" is typically at very low pressure, most of the waste energy is dissipated at valve 17.

If this wasted energy could be totally recovered and utilized to reduce the electrical power consumption of the input pump, the net energy recovery of 59.4% would reduce the operating energy cost to 40.6% of the operating energy cost of the basic non-recovery system of FIG. 1. However, practical systems can only approach this limit due to unavoidable machine losses such as friction of bearings and seals, leakage past pistons, seals and valves, turbulence, etc.

FIG. 2 illustrates a system as in FIG. 1 to which energy recovery has been applied by the addition of an energy exchanger 18, connected into the RO brine discharge flow path between nodes "d" and "e" in place of valve 17. Energy recaptured from pressure drop in this flow is fed back to the primary liquid flow side between nodes "a" and "b" as indicated by the arrow.

There have been many different ways suggested and tried for implementing this energy feedback. It can be applied as torque to shaft 16 and/or via an auxiliary pump or equivalent introduced in series and/or parallel with the existing main seawater pump 12 to reduce its load due to pressure and/or flow rate, and thus reduce the electric power consumption of drive motor 14. The efficiency of this energy exchange system is critically important since it directly affects the actual amount of operating cost savings realized. Electric motor efficiency is about 90-95% and pump efficiency ranges from 50 to 90%, typically 80%, so these machines are generally selected for high efficiency.

Due to the cost incentive, energy exchange systems have been the subject of much design research, development and refinement, and with increasing concern about world wide consumer water availability, there are continued ongoing efforts to reduce the cost of desalination through increased efficiency: it is to this end that the present invention is directed.

DISCUSSION OF KNOWN ART

Many different approaches have been disclosed in patents for apparatus performing the function of energy/pressure exchange, e.g. in the role of energy exchanger 18 in FIG. 2 for energy recovery in RO desalination systems.

FIG. 3 is a simplified functional block diagram illustrating a basic energy exchanger approach, as exemplified in U.S. Pat. No. 6,804,962 to Prueitt for a SOLAR ENERGY DESALINATION SYSTEM, wherein a hydraulic motor 20, driven by the flow of brine discharge from exit port d, has its shaft 21 coupled to the shaft 16 of the main motor 16 which also drives the main pump 12.

Hydraulic motor 20, typically a turbine, converts P*F hydraulic energy to mechanical energy, i.e. torque applied to shaft 16, that acts to reduce the load on main motor 14 and thus reduces the electrical power consumption and the overall operating costs accordingly.

To estimate the efficiency of such a system, it is assumed that the system is designed and regulated so as to hold the input pressure and flow, thus the RO input energy Eb, constant. Assuming a typical high quality commercially available level of 90% efficiency (10% loss) for both the main pump 12 and for the hydraulic recovery motor 20, their combined efficiency will be 81% (19% loss); thus the net energy recovery of 48.1% would reduce the operating energy cost to 51.9% of that of the basic non-recovery system of FIG. 1, whereas the theoretical limits are 59.4% (recovery) and 40.6% (cost).

To avoid the compounding of energy loss by both the pump 12 and the hydraulic motor 20, many types of "pressure" and "energy" exchangers have been developed to exchange energy in a more direct and efficient manner, usually in cylinders with programmed valves and moving piston barriers between the output and input liquid flow paths, exchanging reduction of output pressure for contribution to input pressure and/or flow rate, thus reducing the work load on the main pump 12 and motor 14.

FIG. 4 shows a pressure exchange system utilizing a pair of fixed dual-chamber cylinders 22 and 24 mounted between end block valve enclosures 26 and 27 under control of a timing system that causes free-moving pistons 28 and 30 to reciprocate in a manner to exchange pressure. Because pistons 28 and 30 are equal in diameter on both sides, the primary side acting as pump provides about 60% of the total primary flow, with pump 12 providing only the remaining 40%. However due to exchanger losses, a small pressure booster pump 32 and motor 34 must be added in the primary side. This approach is exemplified by U.S. Pat. No. 5,306,428 to Tonner for METHOD OF RECOVERING ENERGY FROM REVERSE OSMOSIS WASTE STREAMS and U.S. patent application publication US 2005/0166978 A1 to Brueckmann et al for PRESSURE EXCHANGER SYSTEM.

FIG. 5 shows a related approach: two dual-chamber cylinders 36 and 38 are disposed co-linearly in a common cylinder sleeve between end block valve assemblies 40 and 42. A free-moving pair of double-sided asymmetrical pistons 44 and 46, separating the two quasi-complementary chambers in cylinders 36 and 38 respectively, are coupled by central rod 48 which traverses central partition 49 through a sliding seal. Rod 48 is specially dimensioned to reduce the effective piston area on one side of each piston, proportional to respective flow rates, thus eliminating the need for a booster pump and motor as in FIG. 4. This approach is exemplified in U.S. Pat. Nos. 4,637,783 to Andeen for FLUID MOTOR-PUMPING APPARATUS AND METHOD FOR ENERGY RECOVERY and 5,462,414 to Permar for LIQUID TREATMENT APPARATUS FOR PROVIDING A FLOW OF PRESSURIZED LIQUID. In a similar arrangement disclosed in U.S. Pat. No. 6,017,200 to Childs et al for INTEGRATED PUMPING AND/OR ENERGY RECOVERY SYSTEM, the shaft-linked piston pair is driven by a pump to reciprocate axially.

While in each of the foregoing patents the two cylinders are shown equal in diameter, U.S. Pat. No. 3,293,881 to Walker for MEANS FOR TRANSFERRING FLUIDS IN AN ABSORPTION REFRIGERATION SYSTEM shows the two co-linear cylinders (and their respective free-moving central-shaft-coupled pistons) made substantially different in diameter (see FIG. 2) to provide different flow rates which are proportional to piston area for a given stroke length.

It should be understood that the above descriptions of fixed cylinder type energy/pressure exchangers are greatly simplified for ease of understanding, while in real implementation they become extremely complex due to critical requirements of an elaborate control system for motor speed, flow rate, timing, synchronizing and sequencing the control valves and regulators with the reciprocating travel of driven or free-moving pistons as required to realize acceptable operating efficiency.

In a special category of pressure/energy exchangers similar to those described above with free-moving pistons, even these pistons are eliminated to avoid their friction losses and maintenance problems; the seawater and brine are allowed to interface directly at a virtual piston region, and the control system and/or operating staff must monitor and regulate flows, pressures, valve timings, rotational speeds, synchronization, etc., very diligently and precisely to minimize the effects of intermixing.

Whether through sophisticated computer automation or the diligence of skilled human operating staff, high operating efficiency for economical operation is extremely difficult and challenging to accomplish and maintain since it has to take into account many short term and long term side effects and variables such as temperature of liquids and machines, variation in demand and removal of desalinated product, power line voltage variations, membrane condition, leakage, wear degradation of machinery, seals, valves, etc.

Even fluctuation in the cost of electric power is an important factor as evidenced by U.S. Pat. No. 6,998,053 B2 to Awerbuch for WATER DESALINATION PROCESS USING ION SELECTIVE MEMBRANES " . . . at a variable pressure as a function of the cost of electricity . . . ".

FIG. 6 is a cross-sectional representation of an energy exchanger of the rotating cylinder drum assembly type as exemplified in U.S. Pat. No. 3,431,747 to Hashemi et al; for ENGINE FOR EXCHANGING ENERGY BETWEEN HIGH AND LOW PRESSURE SYSTEMS. Two cylinders 50 and 52 (or more) are formed as bores through a rotatable metal cylinder drum 54, mounted to rotate between sliding end valve enclosures 56 and 58 and driven rotationally, typically from the shaft of a motor. A free-moving symmetrical double-sided piston is formed in each cylinder by lightweight balls 60 and 62. Other rotating cylinder drum type pressure exchangers are disclosed in U.S. Pat. Nos. 4,887,942 to Hauge for PRESSURE EXCHANGER FOR LIQUIDS and 6,659,731 B1 to Hauge for PRESSURE EXCHANGER.

A special form of rotating drum assembly with radially-arrayed axial pistons reciprocated by an angled swash-plate, sometimes referred to as a wobble-plate or cam-plate, has been highly developed and used widely in hydraulic motor-pumps for refrigeration and industrial hydraulic machinery, as exemplified in U.S. Pat. No. 5,778,757 to Kristensen et al and U.S. Pat. No. 6,000,316 to Moller et al, both assigned to Danfoss A/S, Nordborg, Denmark under the title HYDRAULIC AXIAL PISTON MACHINE.

Since swash-plate axial piston type units can be designed to function as either a pump or a hydraulic motor, and can be particularly designed to handle different kinds of liquid such as seawater and brine instead of hydraulic fluid, a pressure exchanger such as that shown in FIG. 3 could utilize this type of mechanism for pump 12 and this type of hydraulic motor for motor 20, but this approach would require design and manufacture of special custom units and would still be subject to the compounding of transducer losses in both machines with the resultant limitation on efficiency as described above in connection with FIG. 3.

In summary, in this general field of endeavor, and more particularly in the special category of seawater desalination, there are many unfulfilled needs for improvements particularly in overall operating efficiency and cost economy, which includes energy efficiency, short and long term reliability, and low maintenance.

OBJECTS OF THE INVENTION

It is a primary object to provide a liquid pump in a primary liquid stream in combination with a hydraulic pressure exchanger, in a secondary liquid stream, applying energy recovered therefrom to the primary system in a highly efficient manner to reduce the energy cost of driving the pump.

It is a further object to optimize the combination pump and hydraulic energy exchanger for use in a reverse osmosis desalination system.

It is a further object, in the combination, to provide inherent isolation between the primary liquid stream and the secondary liquid stream, with virtually no possibility of intermixing.

It is a further object to utilize a direct form of pressure exchange that is inherently more efficient and thus less costly to operate than known systems wherein energy recovery from the brine discharge flow is subject to compound losses of two mechanical transducers.

It is a further object to utilize the advantages of highly developed technology of swash-plate type rotary axial piston type hydraulic motor/pumps to implement a single machine combining a pumping function and an energy recovery function.

It is further object in a reverse osmosis desalination system to combine a seawater pressure pump together with an associated brine discharge energy exchanger in a single unit having higher recovery efficiency, lower overall operating costs, fewer component parts, less complex control system requirements and simpler operation than comparable conventional systems.

It is an object that the combined input pump and discharge energy exchange mechanism contain a smaller number of moving parts than equivalent known systems.

SUMMARY OF THE INVENTION

The above mentioned and other objects and advantages have been realized in a pressure pump in a primary liquid flow combined with a pressure exchanger for energy recovery from a secondary liquid flow. A rotor portion, with a central shaft driven from an electric motor, typically includes two adjacent drum-shaped cylinder assemblies, primary and secondary, disposed between a pair of end blocks configured with input/output ports and sliding synchronous reversing valves. Each cylinder assembly is configured with a plurality of axial cylinders, each with an axial piston. The total piston area in the primary cylinder assembly is typically made different from that in the secondary cylinder assembly, in accordance with the difference in primary and secondary liquid flow rates. Pistons in the primary cylinder assembly are connected to corresponding pistons in the secondary cylinder assembly to form a plurality of independent piston assemblies which, in rotational operation, are made to reciprocate axially in a progressive sequential manner by a centrally-located swash-plate with an angled surface facing the primary cylinder assembly, typically held stationary as part of a stator portion that includes the two end blocks and the enclosure.

The combination machine can be optimized for beneficial deployment in a reverse osmosis seawater desalination system to provide benefits including unusual simplicity and low operating cost.

BRIEF DESCRIPTION OF THE DRAWINGS

The above and further objects, features and advantages of the present invention will be more fully understood from the following description taken with the accompanying drawings in which.

DETAILED DESCRIPTION

FIGS. 1-6 have been described above as background and description of known art.

Figure 1:
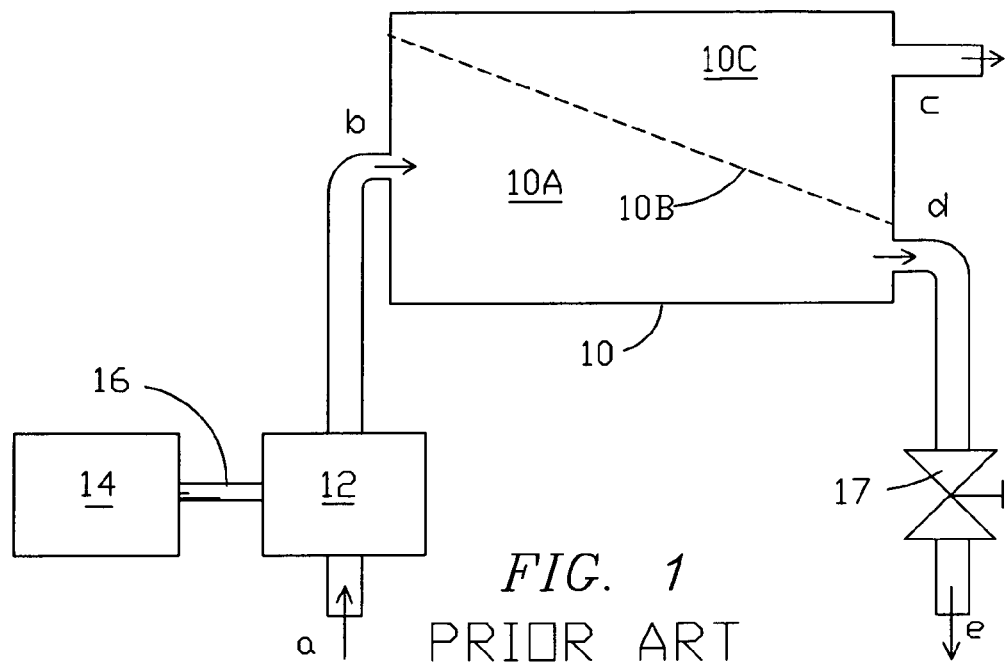
FIG. 1 is a functional block diagram of a basic RO (reverse osmosis) desalination system of known art without energy recovery.
Figure 2:
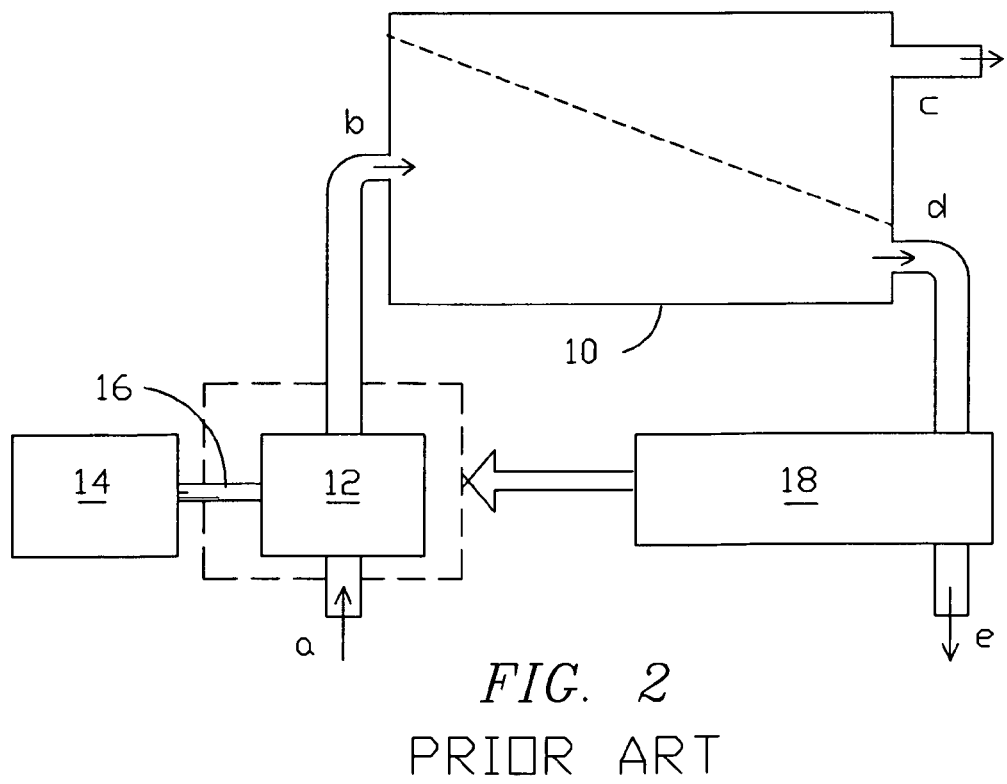
FIG. 2 shows the system of FIG. 1 with energy recovery added.
Figure 3:
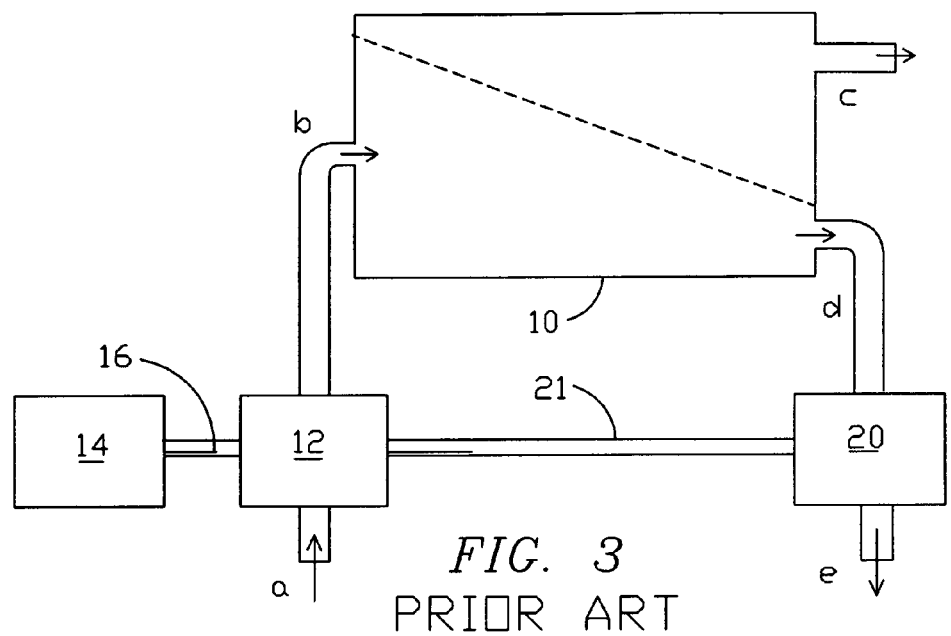
FIG. 3 shows the system of FIG. 2 with energy recovery implemented by a known basic approach utilizing a hydraulic motor in the brine discharge flow path, coupled by a rotating shaft to the rotating shaft pair of the seawater pressure pump and its drive motor.
Figure 4:
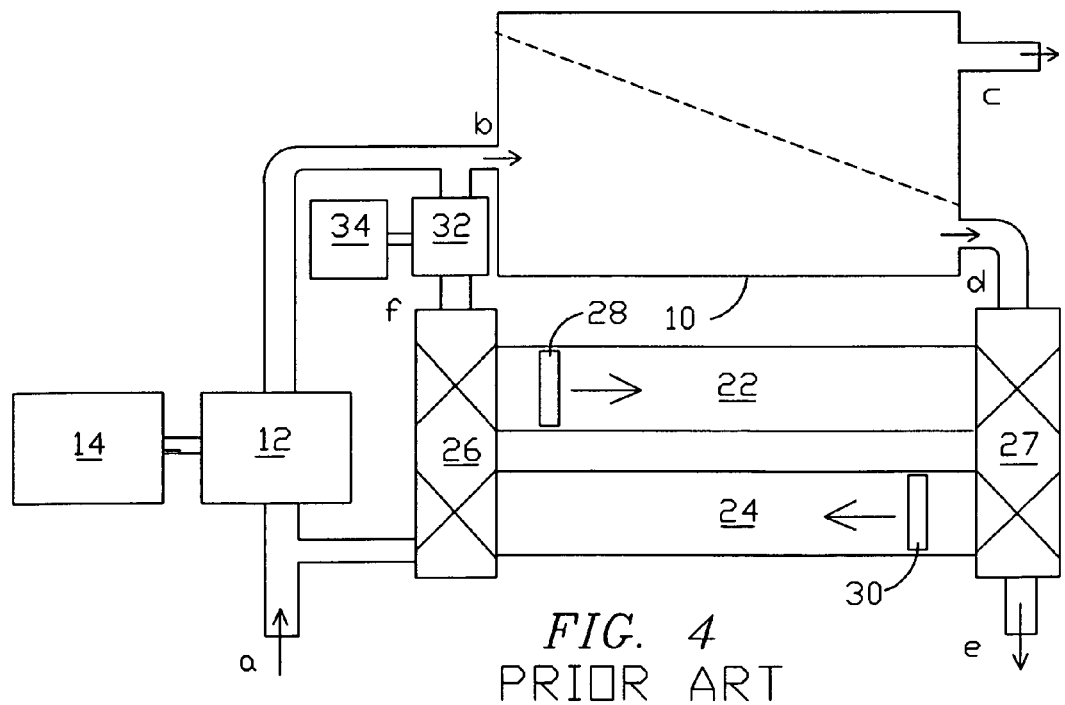
FIG. 4 shows the system of FIG. 2 implemented with another known system utilizing pressure exchange in two fixed parallel axial cylinders each with independent free-moving pistons reciprocated by a control valve system.
Figure 5:
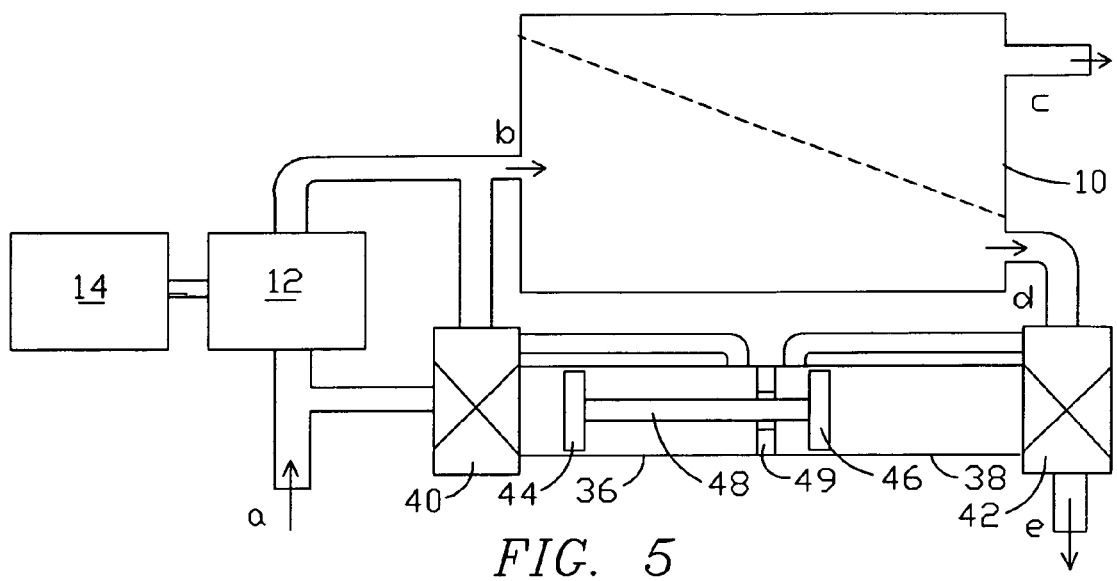
FIG. 5 shows the system of FIG. 2 implemented in another known approach utilizing pressure exchange in two co-linear cylinders, each being divided into two quasi-complementary chambers by a piston, and the two pistons being mechanically coupled by a central rod to reciprocate as a free-moving pair.
Figure 6:
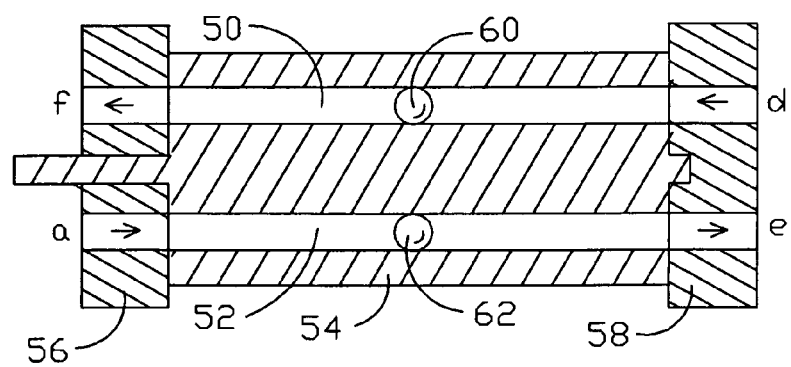
FIG. 6 shows a liquid pressure exchanger with a rotating drum type cylinder assembly wherein each cylinder is divided into two complementary chambers by a free-moving spherical piston.
Figure 7:
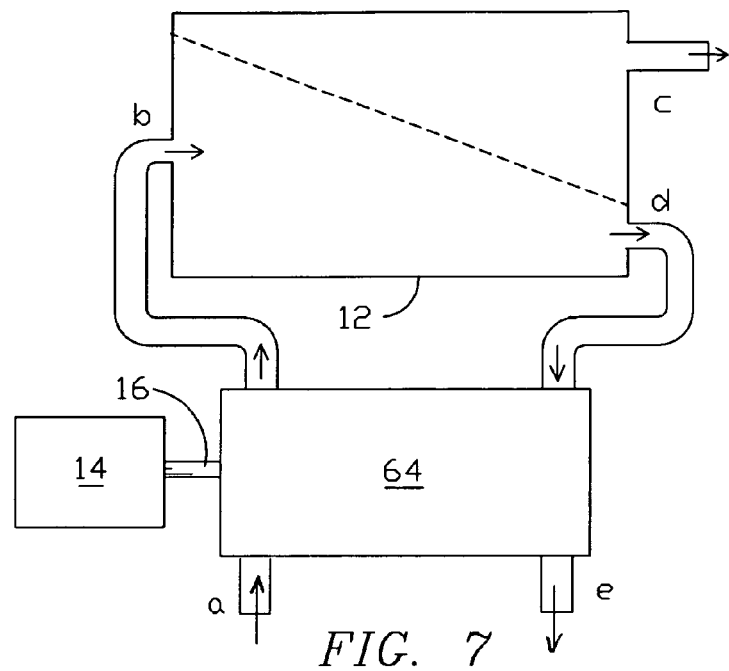
FIG. 7 is a block diagram showing an energy-recovering pump of the present invention deployed in a reverse osmosis desalination system.

FIG. 7 is a functional block diagram showing machine 64, a combination pressure pump and pressure exchanger of the present invention deployed in a reverse osmosis desalination system. The machine 64 is a self-contained unit that includes the main pressure pump and a brine-actuated energy exchanger assisting the pump. It is connected to RO unit 12 seawater input flow path ("a","b") which receives seawater at low pressure from pre-conditioning apparatus, and the brine output flow path ("d","e") in the simple and direct manner shown: all that is needed additionally to operate the RO system 12 is the electric motor 14, seawater acquisition and preconditioning apparatus, and the interconnecting pipelines, with minimal requirements for associated control and monitoring apparatus, primarily to regulate motor speed for input pressure and flow rate.

Figure 8:
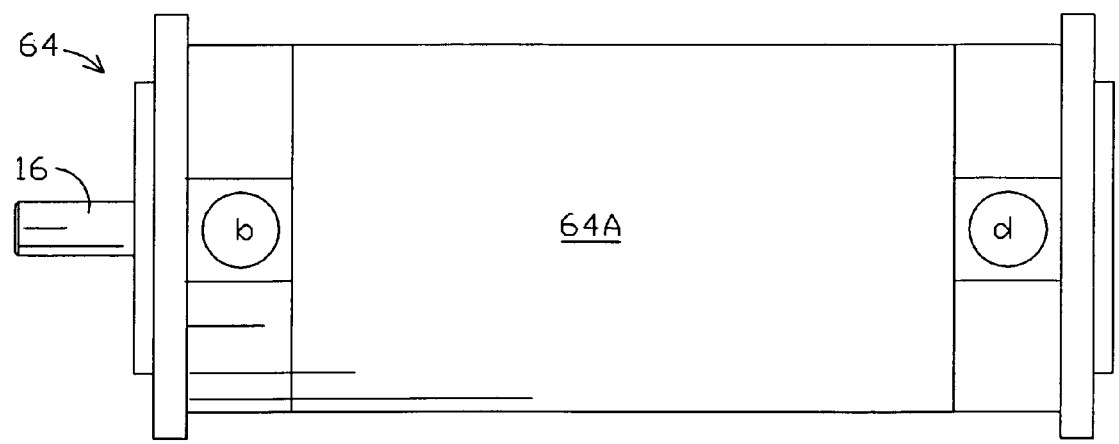
FIG. 8 is a top view of the combination machine of the present invention.

FIG. 8 is a top view of combination machine of the present invention configured in a generally cylindrical enclosure with a drive shaft 16 extending centrally from at least one end for coupling to a motor, typically an electric motor. Shown near each end are high pressure primary output port "b" and secondary input port "d"; in corresponding diametrically opposite locations, but not visible in this view, are low pressure primary input port ("a") and secondary output port ("e"), corresponding to node designations in FIG. 7 and previous figures.

Figure 9:
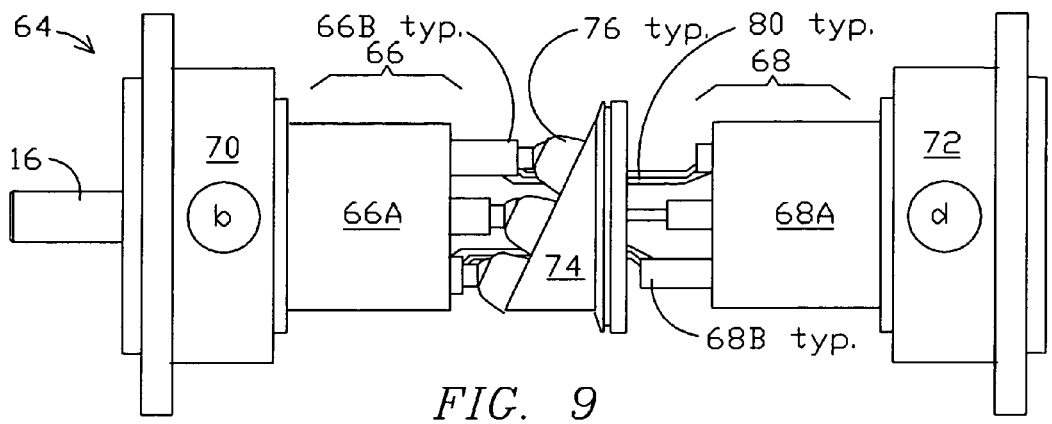
FIG. 9 is a top view of the machine of FIG. 8 with the outer shell removed.

FIG. 9 is a top view of the machine 64 of FIG. 8 with the outer shell housing removed to show, in an illustrative embodiment, a stator assembly including two end blocks 70 and 72 and a rotor assembly including shaft 16 carrying the two rotating co-linear axial cylinder assemblies 66 and 68, i.e. cylinder drums 66A and 68A and their pistons 66B and 68B interconnected by interconnectors 80, typically in pairs. Each cylinder drum 66A and 68A is made to have six cylinders in this illustrative embodiment, each fitted with an associated piston 66B and 68B respectively. The outer ends of cylinder drums 66A and 68A interface two fixed end blocks 70 and 72 respectively, against which cylinder ends are made to form a sliding bearing and a reversing valve function when the rotor assembly is rotated by shaft 16.

Between cylinder assemblies 66 and 68, an elliptically-shaped swash-plate 74, made stationary by peripheral attachment to the outer shell (64A, FIG. 8), provides an inclined flat surface interfacing six sliders 76, configured to captivate ball-shaped ends of corresponding pistons 66B in a swivel manner. Each slider 76 provides a slide pad surface that slides freely against the inclined flat surface of swash-plate 74.

All of the interfacing sliding surfaces of the valve assembly and the swash-plate/slide pad surfaces are preferably precision-machined, polished or otherwise configured for anti-friction and kept lubricated, e.g. by liquid from the primary and/or secondary liquid flows.

Ideally the slide pad surfaces of slides 76 are specially configured with a combination of super-flat surfaces and strategic cavities that enable them to hydroplane against the swash-plate 74 on a film of liquid lubricant.

Figure 11:
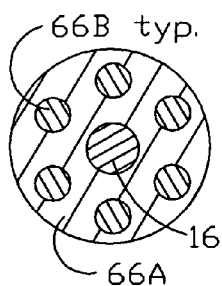
FIG. 11 is a cross-section taken through 11-11 of FIG. 10.

Rotation of the rotor assembly drives the six pistons 66B (as well as the six pistons 68B connected thereto) to reciprocate in progressive sequential cycles over a stroke length determined by the slope of the swash-plate 74 and the diameter of the primary polar array (see FIG. 11).

Each of the pistons 66B in primary cylinder assembly 66 is interconnected by a interconnector 80 to a corresponding piston 68B in secondary cylinder assembly 68 so that each interconnected pair reciprocate together in unison. In this illustrative embodiment, wherein the interconnected pairs are co-linear, interconnectors 80 are made in a special shape to attach securely to the pistons in an offset manner that allows them to traverse through central opening configured in swash-plate 74.

Figure 10:
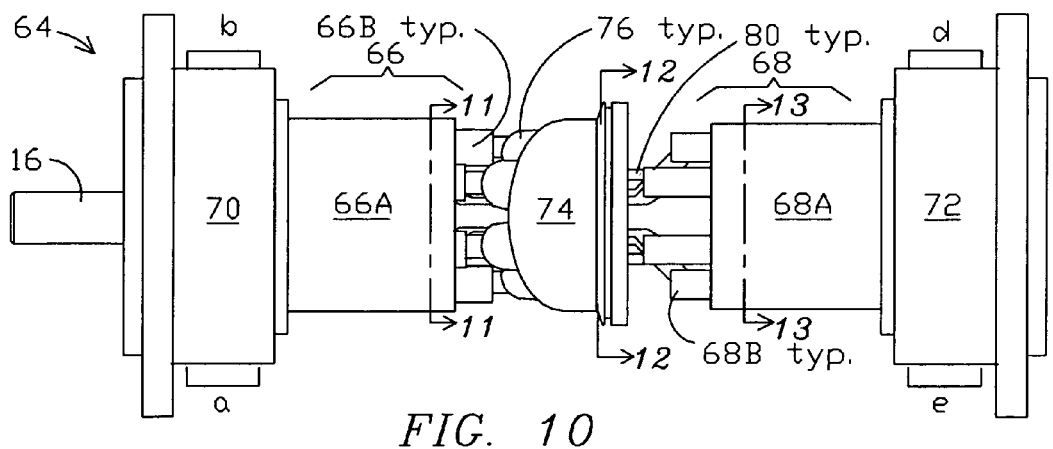
FIG. 10 is a side view of the machine of FIGS. 8 and 9.

FIG. 10 is a side view of the machine of FIGS. 8 and 9 showing the swash-plate 74 and pistons 66A and 66B from the different viewpoint rotated 90 degrees, and showing primary input port "a" in primary end block 70 and secondary output port "e" in secondary end block 72.

FIG. 11 is a cross-section taken through 11-11 of FIG. 10 showing the primary cylinder drum 66A with six cylinders containing pistons 66B arranged in a primary polar array centered on shaft 16.

Figure 12:
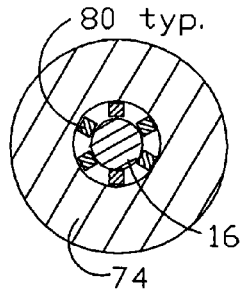
FIG. 12 is a cross-section taken through 12-12 of FIG. 10.

FIG. 12 is a cross-section taken through 12-12 of FIG. 10 showing swash-plate 74 configured with a circular central opening surrounding the six interconnectors 80 and shaft 16.

Figure 13:
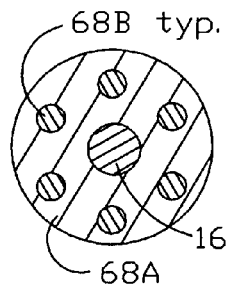
FIG. 13 is a cross-section taken through 13-13 of FIG. 10.

FIG. 13 is a cross-section taken through 13-13 of FIG. 10 showing the secondary cylinder drum 68A with six cylinders containing pistons 68B arranged in a secondary polar array centered on shaft 16. In this illustrative embodiment, the two polar arrays are made identical and the corresponding cylinders/pistons are co-linear, however the secondary cylinders/pistons are made smaller in diameter than the primary cylinders/pistons.

Figures 14, 15:
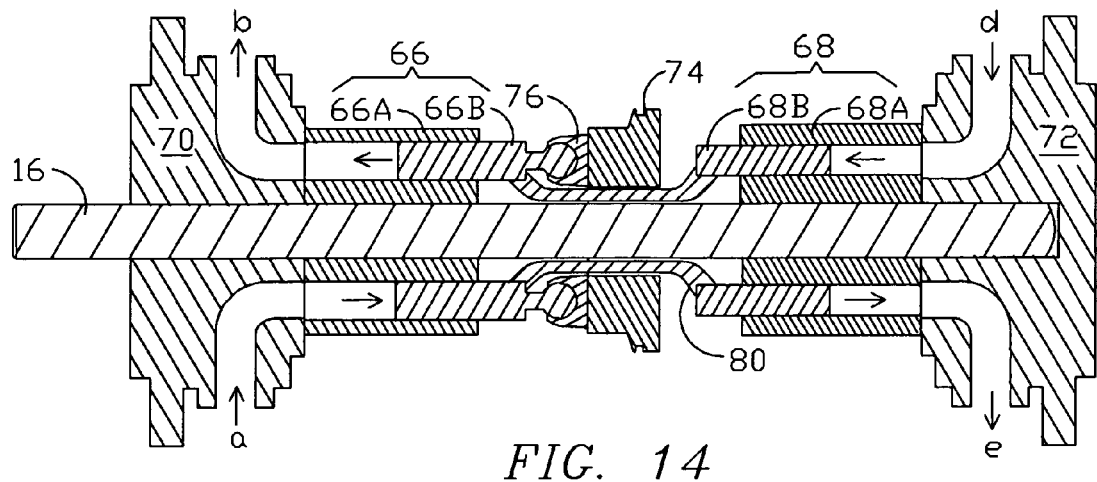
FIG. 14 is a cross-section taken vertically through the central axis of FIG. 9, i.e. a side view as in FIG. 10.
FIG. 15 is table showing nominal values of pressure, flow rate, and energy at five nodes of a reverse osmosis system as shown in FIG. 7 utilizing the combination machine of the present invention.

FIG. 14 is a cross-section taken vertically through the central axis of FIG. 9, i.e. a side view from the same viewpoint as in FIG. 10, showing end blocks 70 and 72 with their internal passageways, primary cylinder assembly 66 showing, in drum 66A, two diagonally opposite cylinders containing pistons 66B. Each piston 66B is seen configured with a ball end at the right hand end, each captivated in a swivel manner in a spherical cavity in corresponding slider 76 with its pad against swash-plate 74. The sliders 76 are normally held against the swash-plate 74 by at least a small amount of net positive liquid pressure from the pistons, however to keep sliders 76 in contact with swash-plate 74 at all times, a retaining arrangement such as one or more coil springs may be incorporated in a suitable manner, typically between the piston assembly and the primary and/or secondary drum.

The secondary cylinder assembly 68 includes drum 68A configured with six cylinders.

Each pair of co-linear pistons 66B and 68B are interconnected by a interconnector 80 that traverses the central opening in swash-plate 74. Interconnectors 80 are securely attached to the piston at each end, e.g. fabricated integrally with the pistons, welded or fastened in an equivalent robust manner. The spherical ends of pistons 66B are captivated in spherical-shaped sockets in sliders 76 in a manner that they can swivel during rotation. The spherical ends on pistons 66B and sliders 76 may be configured with liquid passageways to utilize and direct the water, or other liquid being pumped, as a lubricant to minimize wear and friction losses.

The rotor assembly, in this illustrative embodiment, includes primary cylinder assembly 66, sliders 76, interconnectors 80 and secondary cylinder assembly 68, along with shaft 16 driven from an external motor.

The passageways in end blocks 70 and 72 are shaped as cavities at the interface with the drums 66A and 68A to act as valves that open and close as the rotor assembly is rotated by the motor. The rotating sliders, acted upon by angled swash-plate 74, drive the piston pairs in sequential back-and-forth strokes, each piston completing a two-stoke cycle for each revolution of the piston as driven by shaft 16.

The passageways in end blocks 70 are specially configured in cavities at the interface surfaces so as commutate with successive interconnected pairs of pistons sequentially as they are rotated. The valve cavities in end blocks 70 and 72 are specially shaped to remain fully open as shown in FIG. 14 over a substantial portion of each half-cycle end-to-end stroke, and to smoothly transition to similar communication with the next pair of cylinders for the next half-cycle stroke in the opposite direction.

The arrows shown next to pistons 66B, 68B indicate the direction of travel in the present half-cycle stroke and also indicate the direction of liquid flow. In each of the four cylinders, a working chamber is bounded by the cylinder walls, the piston and whatever passageway (or blockage) is presented at the working end of the cylinders by end blocks 70 and 72 at any instant.

In the rotational position and half-cycle stroke shown, the cavities in the end blocks are made to align and co-operate with the cylinders to provide a liquid flow path between each of the four active chambers and the corresponding one of the four input/output ports "a", "b", "d" and "e" as shown.

In the upper pair of cylinders 66A, 68A, as indicated by the arrows, movement of piston 66B to the left acting as a pump pressurizes the primary liquid (seawater in an RO system) and forces it upwardly through port "b" at maximum pressure and flow rate as determined by the piston area, stroke length and velocity, while the corresponding interconnected piston 68B receives the secondary liquid (brine in an RO system) already under pressure from port "d", driving piston 68B toward the left and thus conveying force and energy via interconnector 80 that acts to assist the pump action of piston 66B, thus implementing pressure exchange and energy recovery.

Meanwhile in the lower pair of cylinders, the opposite slope of the swash-plate 74 moves the co-linear linked piston pair to the right, causing the piston 66B in the primary cylinder assembly 66 to admit primary liquid (seawater in an RO system) at low pressure from port "a" into the chamber of the cylinder, while movement of the piston 68B in the secondary cylinder assembly 68 discharges the low pressure (brine) stream flowing downwardly and out from port "e". Upon further shaft rotation, after a transition to the subsequent half-cycle stroke wherein the pistons are made to reverse direction, the two co-linear pairs shown, having also interchanged their upper and lower locations, will appear at mid-stroke in the condition shown in FIG. 14, shaft 16 having rotated a half turn, i.e. 180 degrees.

Continuous repetition of these two-stroke cycles at a suitable regulated motor speed produces the desired input pressure and flow rate at the port "b" of the machine, which in an RO system is the main node: the main input port ("b", FIG. 7) of the RO chamber, at a required energy level, i.e. product of pressure and flow rate, with as much as 56% of this energy recovered from the waste brine flow by highly efficient pressure exchange from the secondary cylinder assembly, reducing the loading on the pumping action of the primary cylinder assembly, thus substantially reducing the electric power consumed by the pump drive motor and reducing the operating cost accordingly.

The cylinders in secondary assembly 68 to the right in FIG. 14, are seen to be made smaller in diameter than those in the primary assembly 66 to the left to provide appropriate piston areas for different primary and secondary liquid flow rates. In the case of an RO system the brine flow rate is much less than the seawater flow rate, typically 60%, due to amount of desalinated water, typically 40%, recovered by the RO system. The ratio of the two different piston areas is made equal to the ratio of the respective flow rates, i.e. brine discharge flow rate/seawater input flow rate, since the piston stroke length set by the swash-plate angle is the same for all pistons. In the present example with the primary/secondary flow rate and thus the required piston area ratio being 60/100, i.e. 60%, the diameter ratio should be 77.46% (100*0.6^0.5).

Due to this direct form of pressure exchange, and the high conversion efficiency available from the highly developed technology of hydraulic axial-piston swash-plate mechanisms, the energy-recovering system of the invention can be designed to recover as much as 90% of the energy available at brine exit port d. Thus, as discussed above, with a brine flow rate 60% of that of the seawater intake, and a 1% pressure drop in RO unit 10, the net energy recovery of 53.5% will reduce the operating energy cost to 46.5% that of a basic non-recovery system as in FIG. 1, whereas the theoretical limits are 59.4% (recovery) and 40.6% (cost).

This energy saved at the load level can reflect even greater energy savings at the electrical energy source, depending on the electrical system efficiency including the electric motor driving the pump along with losses in the chain of intervening electrical power-handling and distribution devices such as power transformers and power lines. For example, for 80% efficiency of the pump motor and its energy delivery chain, there would be an additional 25% saving of electrical energy at the source.

FIG. 15 is table showing nominal values of pressure P, flow rate F, and energy (P*F) at five system nodes of a reverse osmosis system as shown in FIG. 7 operating from the combination machine of the present invention; four of the five system nodes correspond to the machine's primary and secondary input/output ports.

As described above in the illustrative embodiment, the primary and secondary cylinder assemblies each having six cylinders located on a common polar array makes the interconnected piston assemblies simple and straightforward as six identical co-linear pairs, each having a primary piston interconnected on a common axis with the smaller secondary piston: a simple structure that can be made integral with the slightly offset interconnector. This arrangement provides many unobvious benefits such as facilitating fabrication, inspection and testing, as well as performance advantages of inherent rotor balance, flywheel effect, smoothness of rotation and reliability due to the minimum number of moving parts.

Furthermore, in view of the all-important interaction between the configuration of the interconnected piston assemblies and the reversing valve system in the end blocks, it is believed that this interconnected piston pair assembly system enables both the primary and secondary reversing valve systems to be implemented in their most simplified, elegant and reliable form. Thus the illustrative embodiment represents a special case of convergence of judicious choice, amongst numerous possible variations, that yields an optimal manner in which the invention may be practiced.

There are some minor alternatives and matters of design choice with which the invention could be practiced with comparable if not totally equivalent benefit, and there are many more alternatives that would function generally but that would introduce various degrees of degradation and tradeoff such as added complexity, with resultant produceability, cost and reliability disadvantages.

In the category of relatively risk-free design choices, the secondary piston set could be located on a (larger or) smaller polar array, located in or out of alignment with the primary array, with corresponding changes in the offset shape of the interconnectors, furthermore the secondary cylinder assembly could be made (larger or) smaller.

The quantity of cylinders/pistons per cylinder assembly is not particularly critical. Five or seven could function as well as six, but further departure is not seen as beneficial. Technically the invention could be practiced with as few as two and possibly with one, but would risk unbalance and vibration, and would require a more complex reversing valve and control system.

The orientation of inclined swash-plate 74 as shown in FIGS. 9 and 11 could be reversed so that the flat inclined surface faces toward the secondary cylinder assembly 68 with pistons 68B adapted with ball ends to receive reciprocation via sliders 76 captivated on the ball ends.

Shaft 16 could be extended from the secondary end of the machine instead of the primary end as shown, or it could be made to extend from both ends.

Rather than traversing an opening through the center of the swash plate as shown, the interconnectors could alternatively be arranged to pass around the outside of the swash-plate.

The swash-plate being also known and described in literature as a cam-plate, and even sometimes regarded as a subdivision under the heading of cam mechanisms, suggests that there are other forms of cam mechanisms or modifications of swash-plate mechanisms capable of converting shaft rotation efficiently into reciprocation for pistons in cylinders, with which the present invention could be practiced as design choice alternatives to the embodiment shown.

As an alternative to the cylinder drum assemblies as shown with the cylinders formed as simple bores traversing an otherwise solid drum, the cylinders walls could be made replaceable by utilizing tubular cylinder liner inserts. The drum could made in the form of a framework instead of solid for material savings, or the cylinders could be formed as individual stand-alone sleeves cantilevered from a base at one end or supported at both ends by circular end disks.

The end block reversing valve system shown is widely utilized in hydraulic machines, typically along with the swash-plate mechanism, and as deployed directly with rotating axial cylinder drums, offers advantages of elegant simplicity. However with evolving technology there is increasing potential of alternatively performing the valve reversal function under more sophisticated electronic system control to enable practice of the invention with equivalent results.

While shown as directed to reverse osmosis seawater desalination, the principles of the energy-recovering pump-motor combination of the present invention are not limited thereto and may be beneficially applied to any two liquid flow streams and/or to liquids other than water and/or to other liquid flow energy exchange requirements.

In the category of non-recommended alternatives, it is not essential for all the cylinders in one assembly to be the same size or to be uniformly spaced in a single circular polar pattern as shown. With suitable more complex reversing valve arrangements, and risk of rotor unbalance which could cause vibration, virtually any pattern of multiple identical or different-sized cylinders could be made to function as long as their total piston area meets the necessary designated primary and secondary requirements. The ratio between the total piston areas in the primary and in the secondary cylinder assemblies is a key parameter that must be observed since it is inherently equal to the ratio between the primary flow rate and the secondary flow rate, for a given stroke length.

It is not essential for the interconnected piston assemblies to be limited to two pistons as shown. Interconnected piston assemblies of three or more pistons could be designed to reciprocate as a single mass as long as there is a minimum of one primary piston, one secondary piston and one swash-plate slider in each interconnected piston assembly. With this approach, the primary and secondary cylinder assemblies can be made different in number and many different arrangements of cylinders could be made to function; however this approach introduces complexities not only in the reversing valve systems but also in the drums, interconnectors and swash-plate sliders, with risk of rotor unbalance and vibration.

The swash-plate principle for developing reciprocation is based on relative rotation between two portions, shown herein as a rotor portion including the two sets of cylinders and pistons and a stator portion including the swash-plate and the end block valve system. The same functions could be performed with the present stator components being rotated and the present rotor components made stationary, with complex modification of the reversing valve system. Alternatively the functions could be performed with both portions rotating at different rates and/or directions, but at the expense of further complication.

As an alternative to the mechanical interconnectors between pistons in each interconnected piston assembly, this function could be performed hydraulically.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. An energy-boosted pump comprising:
   a pump portion, driven by an external motor, made and arranged to receive as input a primary liquid flow at a designated supply pressure and to provide, as output to a destination, the liquid flow at a designated primary flow rate and at a designated increased pressure;
   a pressure exchanger portion made and arranged to recover energy from a secondary liquid flow having a designated secondary flow rate and pressure, and to deliver the recovered energy to the primary liquid flow in a manner to contribute a predetermined portion of a total amount of motivating energy required by said pump portion, thus reducing cost of external energy for operating the motor;
   a shaft, defining a central axis, common to said pump portion and said pressure exchanger portion, driven rotationally by the motor;
   a primary cylinder assembly, in said pump portion, attached to said shaft and configured concentrically therewith for rotation as part of a rotor assembly, providing a plurality of cylinder bores arranged axially about the central axis;
   a plurality of cylindrical primary pistons, each fitted slidingly in a corresponding one of the cylinder bores of said primary cylinder assembly;
   piston-driving means for converting rotation of said shaft into reciprocating movement of said primary pistons back and forth over a predetermined stroke length such that a working end of each piston, facing a working end of the associated cylinder bore, is constrained to travel limits within the cylinder bore, the piston-driving means comprising:
   primary reversing valve means made and arranged to utilize the reciprocating movement of said primary pistons and the rotation of said primary cylinder assembly to perform a pumping action so as to pressurize the primary liquid flow;
   a secondary cylinder assembly, in said pressure exchanger portion, attached to said shaft, providing a plurality of cylinder bores arranged axially about the central axis;
   a plurality of cylindrical secondary pistons, each fitted slidingly in a corresponding one of the cylinder bores of said secondary cylinder assembly;
   a plurality of interconnectors, each attached at a primary end to at least one of said primary pistons and attached at a secondary and opposite end to at least one of said secondary pistons, thus forming a plurality of interconnected piston assemblies that can each be reciprocated as a single independent mass; and
   secondary reversing valve means made and arranged to utilize rotation of the secondary cylinder assembly to commutate liquid communication of pressurized liquid of the secondary liquid flow sequentially into said secondary cylinders in a manner to cause said interconnected piston assemblies to perform as a pressure exchanger applying recovered energy to the primary liquid flow via said primary pistons, thus reducing motor-loading and cost of external energy;
   a swash-plate forming a central partition attached to said outer shell and disposed between said primary and secondary cylinder assemblies, having a flat surface facing said primary cylinder assembly and inclined at a predetermined swash-plate angle relative to said shaft and having an elliptical peripheral shape, configured with a central clearance opening traversed by said shaft and by said interconnectors;
   a set of sliders, each associated with a corresponding one of the interconnected piston assemblies and attached in a swivel manner thereto, each slider configured with a flat smooth surface interfacing and sliding on the flat surface of said swash-plate so as to reciprocate each interconnected piston assembly independently in repeating sequential cycles in response to rotation of said shaft;
   a generally tubular outer shell;
   a primary end block disposed in a primary end region of said outer shell and attached thereto, configured with a central shaft opening concentric with the central axis;
   a secondary end block disposed at a secondary end of said outer shell and attached thereto, configured with a central shaft opening concentric with the central axis;
   said shaft traversing the openings and extending outwardly from at least one of said end blocks and receiving rotational drive from the motor, said shaft attached to and rotatably supporting said primary cylinder assembly at a primary end region of said outer shell, with the working ends of the cylinders thereof interfacing flat inwardly-facing surface of said primary end block, and supporting said secondary cylinder assembly at a secondary and opposite end region of said outer shell, with the working ends of the cylinders thereof interfacing flat inwardly-facing surface of said secondary end block;

whereby total energy required to reciprocate said interconnected piston assemblies at a rate to produce a designated primary output liquid pressure and flow rate by pump action, is reduced to a net external input energy requirement by an amount of energy recovered by said pressure exchanger portion from pressure and flow rate of the secondary liquid source and delivered to the primary liquid flow via the interconnected piston assemblies, thus reducing motor source energy cost.

2. The energy-boosted pump as defined in claim 1 wherein each of said interconnectors is attached at the ends to the associated pistons by welding to form an interconnected piston assembly.

3. The energy-boosted pump as defined in claim 1 wherein each interconnected piston assembly is made as an integral unit including the interconnector and the associated pistons.

4. The energy-boosted pump as defined in claim 1 wherein the cylinders pistons are dimensioned so as to provide a ratio between total area of the primary pistons and total area of the secondary pistons that is equal to a ratio between the designated primary flow rate and the designated secondary flow rate.

5. The energy-boosted pump as defined in claim 1 wherein:
each interconnected piston assembly contains only one primary piston and only one secondary piston; and
said plurality of primary pistons and said plurality of secondary pistons each consist of six pistons.

6. The energy-boosted pump as defined in claim 1 wherein:
said plurality of primary pistons and said plurality of secondary pistons are disposed on a common polar pattern with corresponding primary and secondary pistons co-linear and respectively interconnected by six like interconnectors.

7. The energy-boosted pump as defined in claim 1 wherein:
the supply of the primary liquid flow is a supply of seawater;
the destination of the primary liquid flow is an input port of a reverse osmosis desalination chamber;
the source of the secondary liquid flow is a brine output port of the desalination chamber; and
more than half of a total energy requirement for designated pressure and flow rate at the input port of the reverse osmosis desalination chamber is supplied as energy recovered by said pressure exchanger portion, so that the external input energy requirement is reduced to less than half of the total energy requirement.

8. An energy-boosted pump comprising:
a pump portion, driven by an external motor, made and arranged to receive as input a primary liquid flow at a designated supply pressure and to provide, as output to a destination, the liquid flow at a designated primary flow rate and at a designated increased pressure;
a pressure exchanger portion made and arranged to recover energy from a secondary liquid flow having a designated secondary flow rate and pressure, and to deliver the recovered energy to the primary liquid flow in a manner to contribute a predetermined portion of a total amount of motivating energy required by said pump portion, thus reducing cost of external energy for operating the motor;
a shaft, defining a central axis, common to said pump portion and said pressure exchanger portion, driven rotationally by the motor;
a primary cylinder assembly, in said pump portion, attached to said shaft and configured concentrically therewith for rotation as part of a rotor assembly, providing a plurality of cylinder bores arranged axially about the central axis;
a plurality of cylindrical primary pistons, each fitted slidingly in a corresponding one of the cylinder bores of said primary cylinder assembly;
piston-driving means for converting rotation of said shaft into reciprocating movement of said primary pistons back and forth over a predetermined stroke length such that a working end of each piston, facing a working end of the associated cylinder bore, is constrained to travel limits within the cylinder bore;
primary reversing valve means made and arranged to utilize the reciprocating movement of said primary pistons and the rotation of said primary cylinder assembly to perform a pumping action so as to pressurize the primary liquid flow;
a secondary cylinder assembly, in said pressure exchanger portion, attached to said shaft, providing a plurality of cylinder bores arranged axially about the central axis;
a plurality of cylindrical secondary pistons, each fitted slidingly in a corresponding one of the cylinder bores of said secondary cylinder assembly;
a plurality of interconnectors, each attached at a primary end to at least one of said primary pistons and attached at a secondary and opposite end to at least one of said secondary pistons, thus forming a plurality of interconnected piston assemblies that can each be reciprocated as a single independent mass; and
secondary reversing valve means made and arranged to utilize rotation of the secondary cylinder assembly to commutate liquid communication of pressurized liquid of the secondary liquid flow sequentially into said secondary cylinders in a manner to cause said interconnected piston assemblies to perform as a pressure exchanger applying recovered energy to the primary liquid flow via said primary pistons, thus reducing motor-loading and cost of external energy;
a generally tubular outer shell;
a primary end block disposed in a primary end region of said outer shell and attached thereto, configured with a central shaft opening concentric with the central axis;
a secondary end block disposed at a secondary end of said outer shell and attached thereto, configured with a central shaft opening concentric with the central axis;
said shaft traversing the openings and extending outwardly from at least one of said end blocks and receiving rotational drive from the motor, said shaft attached to and rotatably supporting said primary cylinder assembly at a primary end region of said outer shell, with the working ends of the cylinders thereof interfacing flat inwardly-facing surface of said primary end block, and supporting said secondary cylinder assembly at a secondary and opposite end region of said outer shell, with the working ends of the cylinders thereof interfacing flat inwardly-facing surface of said secondary end block;
wherein said primary reversing valve means and said secondary reversing valve means comprise:
each said cylinder assembly being configured with the working ends of the cylinder bores extending to openings in a flat sliding surface of the cylinder assembly perpendicular to said shaft and interfacing a corresponding one of said end blocks;
each said end block being configured to have a liquid input port, a liquid output port, and a flat sliding surface interfacing the flat sliding surface of the corresponding cylinder assembly in a close-tit water-tight manner and further configured with a set of passageways connecting the input and output ports respectively to corresponding valve cavities exiting at the flat sliding surface of said end block;

whereby total energy required to reciprocate said interconnected piston assemblies at a rate to produce a designated primary output liquid pressure and flow rate by pump action, is reduced to a net external input energy requirement by an amount of energy recovered by said pressure exchanger portion from pressure and flow rate of the secondary liquid source and delivered to the primary liquid flow via the interconnected piston assemblies, thus reducing motor source energy cost.

9. The energy-boosted pump as defined in claim 8 wherein each end block is made and arranged to hold the input port connected in liquid communication with the working end of the cylinder bore of the corresponding cylinder assembly while the associated piston is moving away from the end block; and to alternately, a half-cycle later, hold the output port connected in liquid communication with the working end of the same cylinder bore while the associated piston is moving toward the end block.

10. The energy-boosted pump as defined in claim 9 wherein, in the pump portion, said primary end block is made and arranged to interact with the cylinder bore openings in the flat surface of the primary cylinder assembly in a manner to serve as reversing valves that open and close in a predetermined manner when the rotor assembly rotates so as to implement pump action that receives the primary liquid flow at low pressure from the primary source at the primary liquid input port and delivers the primary liquid flow via the primary output port to a destination, at a desired elevated liquid pressure and flow rate, in response to said shaft being driven at a required rotational speed.

11. The energy-boosted pump as defined in claim 9 wherein in the pressure exchanger portion, said secondary end block is made and arranged to interact with the cylinder bore openings in the flat surface of the secondary cylinder assembly in a manner to serve as reversing valves that open and close in a predetermined manner when the rotor assembly rotates so as to implement pressure exchanger action that receives the secondary liquid flow at high pressure at the secondary liquid input port, exchanges pressure to the primary liquid flow, and discharges the secondary liquid flow via the secondary output port at a very low liquid pressure and flow rate, in response to said shaft being driven at a required rotational speed.

12. The energy-boosted pump as defined in claim 8 wherein:
   each interconnected piston assembly contains only one primary piston and only one secondary piston; and
   said plurality of primary pistons and said plurality of secondary pistons each consist of six pistons.

13. The energy-boosted pump as defined in claim 8 wherein:
   said plurality of primary pistons and said plurality of secondary pistons are disposed on a common polar pattern with corresponding primary and secondary pistons co-linear and respectively interconnected by six like interconnectors.

14. The energy-boosted pump as defined in claim 8 wherein:
   the supply of the primary liquid flow is a supply of seawater;
   the destination of the primary liquid flow is an input port of a reverse osmosis desalination chamber;
   the source of the secondary liquid flow is a brine output port of the desalination chamber; and
   more than half of a total energy requirement for designated pressure and flow rate at the input port of the reverse osmosis desalination chamber is supplied as energy recovered by said pressure exchanger portion, so that the external input energy requirement is reduced to less than half of the total energy requirement.

\* \* \* \* \*